(12) United States Patent
Beisiegel et al.

(10) Patent No.: US 7,926,032 B2
(45) Date of Patent: Apr. 12, 2011

(54) TWO META-LEVEL MODELING APPROACH FOR MAPPING TYPED DATA

(75) Inventors: Michael Beisiegel, Poughkeepsie, NY (US); Charles D. Bridgham, Cary, NC (US); Frank J. Budinsky, Newmarket (CA); Eduardus A. T. Merks, Ballantrae (CA); Lawrence S. Rich, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 2247 days.

(21) Appl. No.: 10/198,556

(22) Filed: Jul. 18, 2002

(65) Prior Publication Data
US 2004/0015515 A1 Jan. 22, 2004

(51) Int. Cl.
*G06F 9/44* (2006.01)
(52) U.S. Cl. ........ 717/122; 717/106; 717/107; 717/109; 717/139
(58) Field of Classification Search ........... 717/106–137
See application file for complete search history.

(56) References Cited

U.S. PATENT DOCUMENTS

| | | | | |
|---|---|---|---|---|
| 6,463,582 | B1 * | 10/2002 | Lethin et al. | 717/158 |
| 6,802,059 | B1 * | 10/2004 | Lyapustina et al. | 717/143 |
| 2002/0091702 | A1 * | 7/2002 | Mullins | |
| 2003/0120665 | A1 * | 6/2003 | Fox et al. | |

* cited by examiner

*Primary Examiner* — Chuck O Kendall
(74) *Attorney, Agent, or Firm* — Hoffman Warnick LLC; Jeanine S. Ray-Yarletts (57) ABSTRACT

The present invention is directed to an improved mapping system and code generation system. Embodiments of the present invention separate the mapping of data elements into two metalevels. The first metalevel maps between types of elements (e.g., string, int, float, varchar, etc.). This first metalevel mapping is associated with an object that contains a method (i.e., a function) which performs the conversion between the type of the element from a first data structure to the type of element in a second data structure. The second metalevel describes the actual mapping between the data elements at issue. Accordingly, the second metalevel results in an instance of the first metalevel object. Source code or scripts generated in accordance with this separation provide numerous advantages including improved flexibility, reduced storage space usage and others. The two metalevel modeling of the invention can be embodied in source code (or script) generators to generate more efficient source code (or scripts).

25 Claims, 7 Drawing Sheets

TWO META-LEVEL MODELING APPROACH FOR MAPPING TYPED DATA

FIELD OF THE INVENTION

The present invention relates to the mapping of data and, more particularly, a two meta-level modeling approach for mapping typed data and source code generating embodiments employing said two meta-level modeling approach for mapping typed data.

BACKGROUND OF THE INVENTION

As a result of the ubiquity of computer and information technology, data is often transferred or transmitted between various computer systems (which may or may not be executing on different physical machines). This data may be in the form of messages, objects and the like. As a result of this exchange of information, it is often necessary to map between the data structures (which include objects) of a first system to the data structures of a second system.

An example of such transference or transmittal of data occurs when a client-side Java applet (or a server-side servlet) attempts to interact with a database (such as the IBM® DB2® relational database product). The applet may be issuing a request to retrieve data from, or be issuing a request to transfer data to, the database. The data which is to be retrieved or transferred will likely be stored as values associated with a data member (usually referred to as "field" in Java™) in an object which forms part of the applet/servlet. However, data stored in a relational database is stored as a field in a row and column in a table. As a result of the foregoing exemplary interaction, a mapping between the data member in the object and the records in a relational database table is required to ensure that data can be passed between the two systems.

Figure 1:
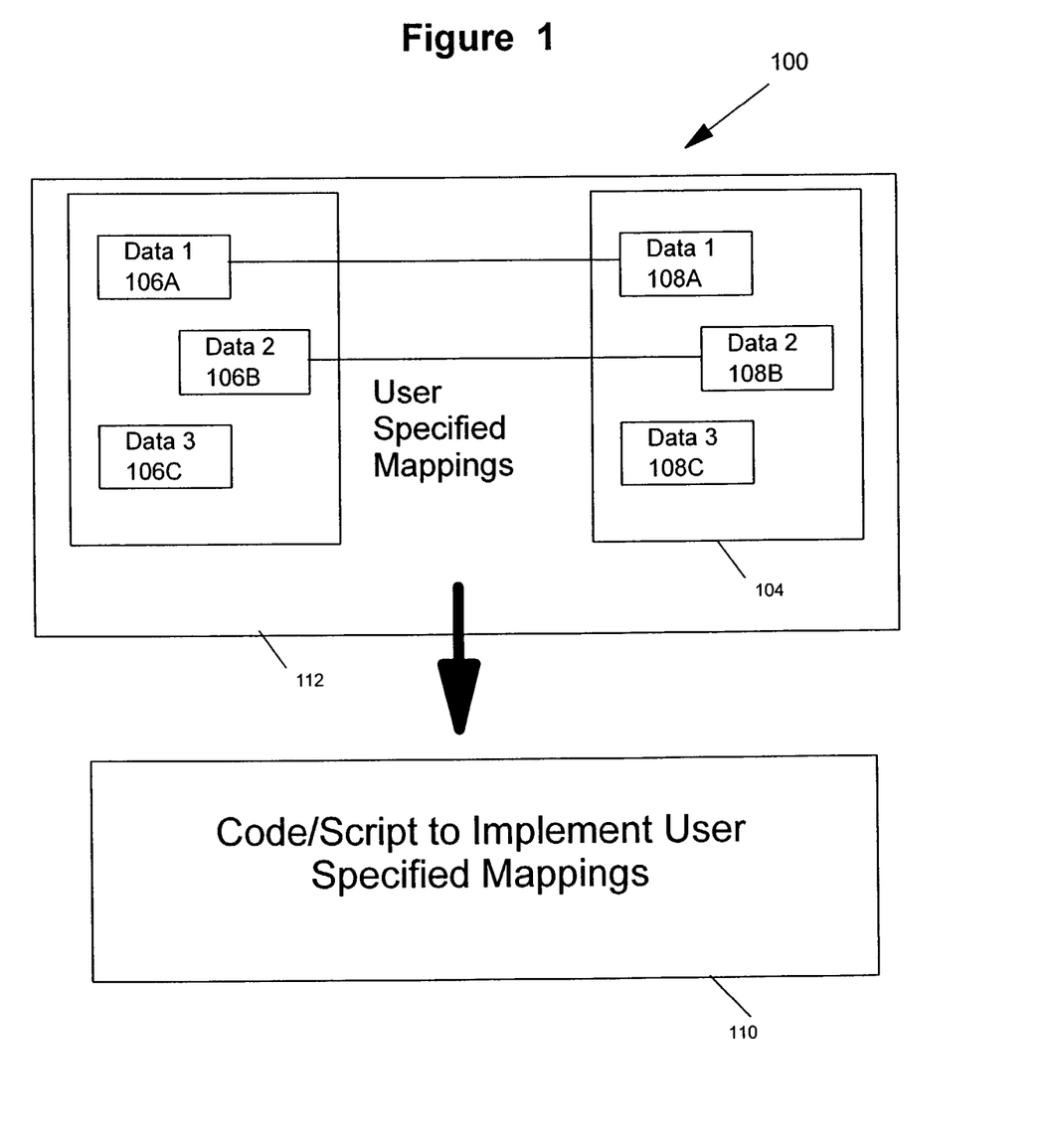
FIG. 1 is a prior art system for generating source code, which when executed, generates source code for converting data from a first data structure to data in a second data structure.

Many products have been developed to facilitate the mapping described above. As illustrated in FIG. 1, the prior art systems 100 typically provide a graphical user interface (GUI) 112 in which the first data structure 102 and the second data structure 104 are visually rendered. The user is then prompted to visually connect (i.e., map) the elements 106 of the first data structure which are related to the elements 108 of the second data structure 104. Upon receipt of an instruction (e.g., selecting "Generate" or "OK", not shown) the prior art systems 100 will generate a script or source code 110. The source code 110, when interpreted or compiled and executed, will implement the mapping described by the user input. These prior art mapping systems have often been designed to enable somewhat novice developers to effectively and quickly design applications which implement some business process or logic.

While the prior art systems are effective, these systems are not necessarily efficient. For instance, for large systems, there exists the need to map large numbers of elements in first data structures to large numbers of elements in other data structures. As such, under prior art systems known to the inventors, source code is individually generated (or the information is modeled individually and stored in a repository) for each of these large numbers of mappings despite the similarity between many of these mappings. Additionally, when there is a change to one of the data structures (or even to one of the elements in a data structure) then much source code needs to be regenerated.

In addition to the preceding shortcomings, prior art systems require the user to be familiar with the data structures of both systems. For example, assume that in the first data structure (an object which forms part of an Enterprise JavaBean) a data element "price" exists. In the second data structure (a relational database table) there exists two columns, "value" and "cost". Without some additional information (i.e., an understanding of both data structures) a user would have some difficulty in providing the mapping input necessary for the proper source code generation.

Finally, present systems often pose difficulties where a second data structure is to be created from a first data structure. These difficulties often arise where there is no direct correlation between the types of elements in the two data structures. Assume, for example, that the first data structure is a Java object and the second data structure is table in a relational database. A data element in the Java object may be of "string" type. Unfortunately, in the relational database there may not exist the "string" type. However, there may be a corresponding type such as the "varchar" type. Unfortunately, without an in-depth understanding of the underlying language of the first data structure (Java, in the example) and the second data structure (SQL, in the example), providing the prior art mapping systems with the input required is very difficult for some users or developers. Unfortunately, it is often novice developers that are often without this understanding.

In a further shortcoming of the known present system, it is often the case that some of the functions used to convert are hard coded into these systems and, therefore, hidden from advanced developers.

As such, an improved mapping system and code generation which addresses, at least in part, some of the shortcomings identified above would be desired.

SUMMARY OF THE INVENTION

The present invention is directed to an improved mapping system and code generating which addresses, at least in part, some of the various shortcomings described above.

Embodiments of the present invention separates the mapping of data elements into two metalevels. The first metalevel maps between types of elements (e.g., string, int, float, varchar, etc.). This first metalevel mapping is associated with an object that contains a method (i.e., a function) which performs the conversion between the type of the element from the first data structure to the type of element in second data structure.

The second metalevel describes the actual mapping between the data elements at issue. Accordingly, the second metalevel results in an instance of the first metalevel object (in object oriented embodiments).

The two-level model, described herein, allows, in some embodiments, the persistent storage of the type-related portion of the mapping information (e.g., as generated code and, it is expected, more often in some other persistent data model from which code is generated as a separate operation) for all the mappings between objects of the same types.

The separation of the mapping into two metalevels provides numerous advantages.

First, there may be a significant saving in terms of space required by applications generated which use the mapping. This advantage results from the reuse of the function (or method) which is associated with a particular type-related mapping (e.g., a string to an integer). This type-related function need be only stored once for all mappings between a selected pair of data types rather once for each instance of a mapping between pairs of elements for a selected pair of data types.

An additional advantage realized through embodiments of the present invention is increased flexibility. This flexibility is the result of providing a user with the ability to quickly and easily change the function performed for mapping between a first type and a second type. This change is effected by modifying the function in the parent object which models the mapping. This change will then be implicitly applied to all mappings between the first type and the second type.

Further flexibility is realized by enabling unique instances of mapping between a given pair of element types (e.g., a "string" to a "varchar") to be uniquely defined. This advantage is realized by overriding the type mapping function for the given pair of element types with a unique function that will only be applied to the selected mapping of data elements (rather than being applied to all data element mappings for the types associated with the selected pair of element types).

In a still further advantage, embodiments of the present invention assist users in mapping between data elements. Assistance may be provided by presenting a the user the type mapping functions available. The mapping types presented to the user may be: for the data type which converts (or transforms) from the data type of the element in the first (or source) data structure; for the data type which converts to the data type of the element of the second (or target) data structure; or for conversion between the data type of the element from first data structure to the data type of the element from the second data structure.

In a still further advantage, embodiments of the invention assist developers faced with the situation of using an existing source data structure used by a first system to create a target data structure used by a second system. In this situation, embodiments of the invention may provide developers with a list of functions which convert the data types present in the source data structure to data types which are used by the second system. In this way, developers, who may only have limited knowledge of the second system, are assisted in developing useful interactions between the first and second system.

In a still further advantage, embodiments of the present invention may provide for type converters to be explicitly available to a user (usually an advanced user). By providing access to the type converters, advanced users are enabled to customize the information relating to the type converters.

Embodiments of the present invention may be employed in source code or script generators which generate source code (or scripts), which when compiled and executed (or interpreted) realize the advantages noted above and others that will be apparent to those of ordinary skill in the art.

Other aspects and features of the present invention will become apparent to those ordinarily skilled in the art upon review of the following description of specific embodiments of the invention in conjunction with the accompanying figures.

In accordance with still another aspect of the present invention there is provided a method for generating source for converting from data stored in a first data element to data stored in a second data element, said first and second data elements associated with a first and second data element types, said method comprising: generating a first source code module to receive said first data element and output said second data element, said first source code module calling a second source code module, said second source code module converting between said first data element type and said second data element type.

In accordance with still another aspect of the present invention there is provided a method for converting between from a plurality of first data elements to a plurality of second data elements, each of said plurality of first data elements associated with a first data type and each of said plurality of second data elements associated with a second data type, and wherein a first data element forming part of said plurality of first data elements is to be mapped to a corresponding second data element forming part of said plurality of second data elements said method comprising: generating a first source code module for converting said first data type to said second data type; for each pair of first and second data elements, said first data element of said pair being mapped to said second data element of said pair, generating a second source code module receiving said first data element and outputting said second data element, said second source code module calling said first source code module.

In accordance with still another aspect of the present invention there is provided a method for generating source code to convert between a first data element and a second data element, said first data element associated with a first data type and said second data element associated with a second data type, said first and second data elements forming a mapping pair, said method comprising: for data received describing said mapping pair, identifying said first data type and said second data type; generating source code for mapping said first data element to said second data element, said source code calling a data type converter corresponding to the first and second data types identified.

In accordance with still another aspect of the present invention there is provided a computer readable media storing instructions and data, said instructions and data for adapting a computer system to for generate source for converting from data stored in a first data element to data stored in a second data element, said first and second data elements associated with a first and second data element types, said computer system adapted to: generate a first source code module to receive said first data element and output said second data element, said first source code module calling a second source code module, said second source code module converting between said first data element type and said second data element type.

In accordance with still another aspect of the present invention there is provided a method of source code generation, said source code for mapping a first data object having a first data type to a second data object having a second data type, said method comprising: responsive to input data describing said mapping, generating source code referencing a type converter object, said type converter object converting between said first data type and said second data type.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 2:
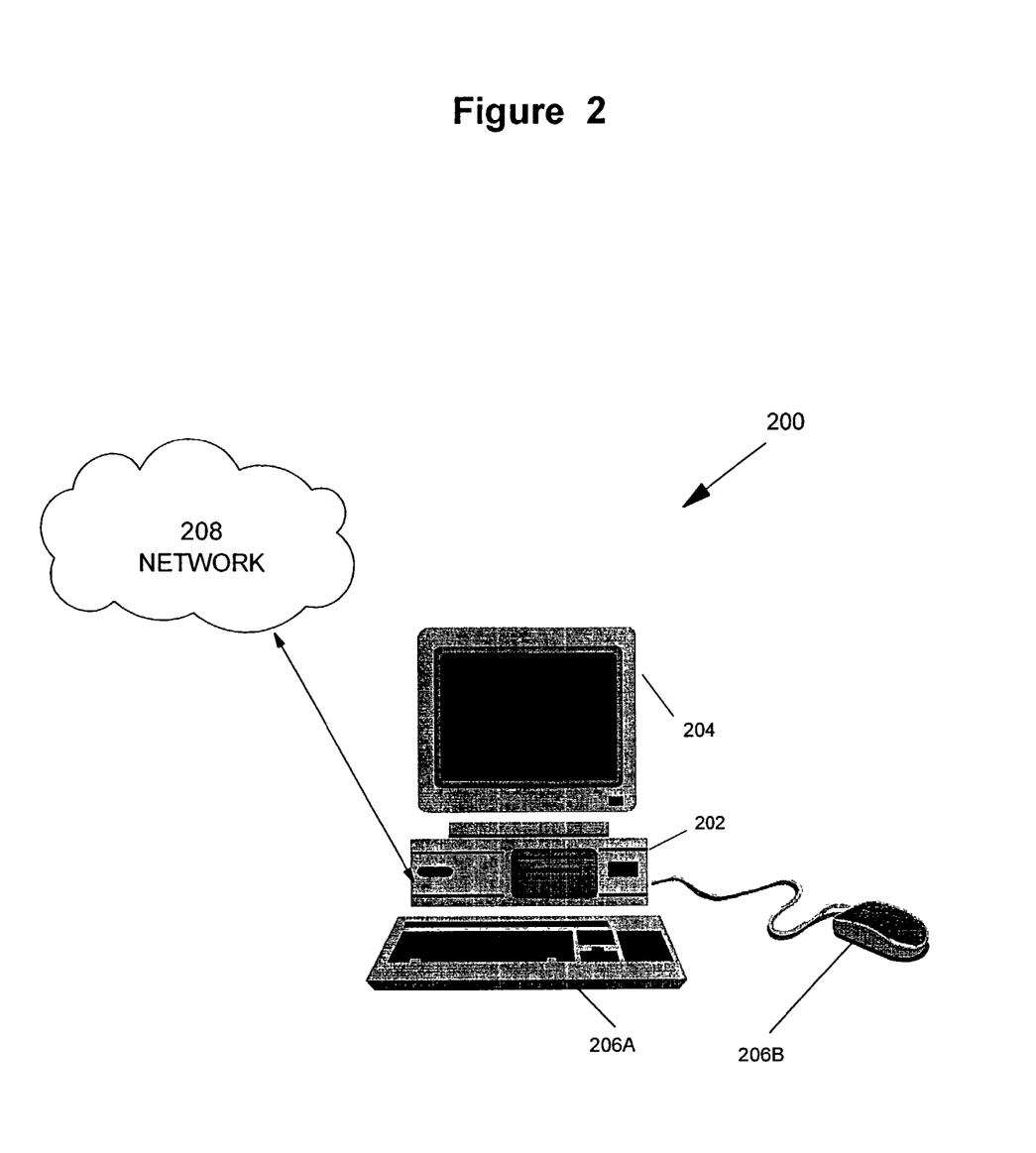
FIG. 2 schematically illustrates a computer system embodying aspects of the invention.

An embodiment of the invention, computer system 200, is illustrated in FIG. 2. Computer system 200, illustrated for exemplary purposes as a networked computing device, is in communication with other networked computing devices (not shown) via network 210. As will be appreciated by those of ordinary skill in the art, network 210 may be embodied using conventional networking technologies and may include one or more of the following: local area networks, wide area networks, intranets, public Internet and the like. Computer system 200 may interact with other networked computer systems (not shown) providing application analysis of a distributed application.

Throughout the description herein, an embodiment of the invention is illustrated with aspects of the invention embodied solely on computer system 200. As will be appreciated by those of ordinary skill in the art, aspects of the invention may be distributed amongst one or more networked computing devices which interact with computer system 200 via one or more data networks such as, for example, network 210. However, for ease of understanding, aspects of the invention have been embodied in a single computing device—computer system 200.

Computer system 200 includes processing system 202 which communicates with various input devices 204, output devices 206 and network 210. Input devices 204, two of which are shown, may include, for example, a keyboard, a mouse, a scanner, an imaging system (e.g., a camera, etc.) or the like. Similarly, output devices 206 (only one of which is illustrated) may include displays, information display unit printers and the like. Additionally, combination input/output (I/O) devices may also be in communication with processing system 202. Examples of conventional I/O devices include removable and fixed recordable media (e.g., floppy disk drives, tape drives, CD-ROM drives, DVD-RW drives, etc.), touch screen displays and the like.

Figure 3:
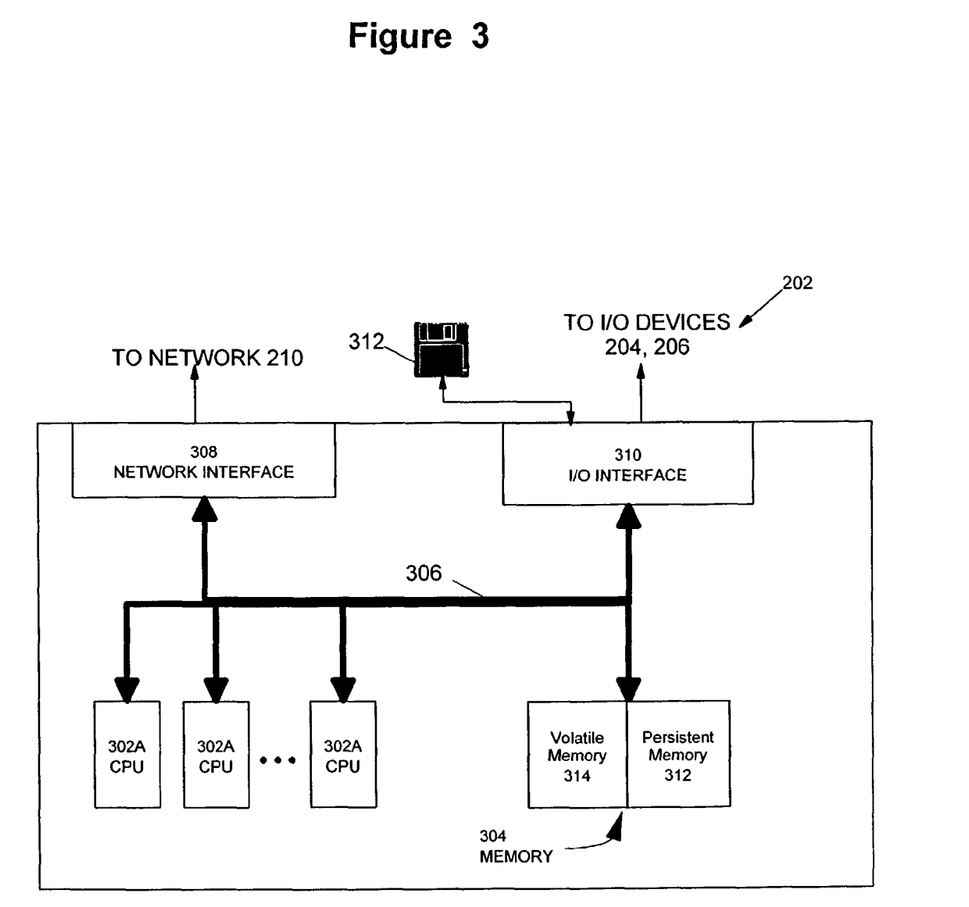
FIG. 3 schematically illustrates, in greater detail, a portion of the computer system of FIG. 2.

Exemplary processing system 202 is illustrated in greater detail in FIG. 3. As illustrated, processing system 202 includes several components—central processing unit (CPU) 302, memory 304, network interface (I/F) 308 and I/O I/F 310. Each component is in communication with the other components via a suitable communications bus 306 as required.

CPU 302 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 202 could use alternative CPUs and may include embodiments in which one or more CPUs are employed. CPU 302 may include various support circuits to enable communication between itself and the other components of processing system 202.

Memory 304 includes both volatile and persistent memory for the storage of: operational instructions for execution by CPU 302, data registers, application storage and the like. Memory 304 preferably includes a combination of random access memory (RAM), read only memory (ROM) and persistent memory such as that provided by a hard disk drive.

Network I/F 308 enables communication between computer system 200 and other network computing devices (not shown) via network 210. Network I/F 308 may be embodied in one or more conventional communication devices. Examples of a conventional communication device include an Ethernet card, a token ring card, a modem or the like. Network I/F 308 may also enable the retrieval or transmission of instructions for execution by CPU 302 from or to a remote storage media or device via network 210.

I/O I/F 310 enables communication between processing system 202 and the various I/O devices 204, 206. I/O I/F 310 may include, for example, a video card for interfacing with an external display such as output device 206. Additionally, I/O I/F 310 may enable communication between processing system 202 and a removable media 312. Although removable media 312 is illustrated as a conventional diskette other removable memory devices such as Zip™ drives, flash cards, CD-ROMs, static memory devices and the like may also be employed. Removable media 312 may be used to provide instructions for execution by CPU 302 or as a removable data storage device.

Figure 4:
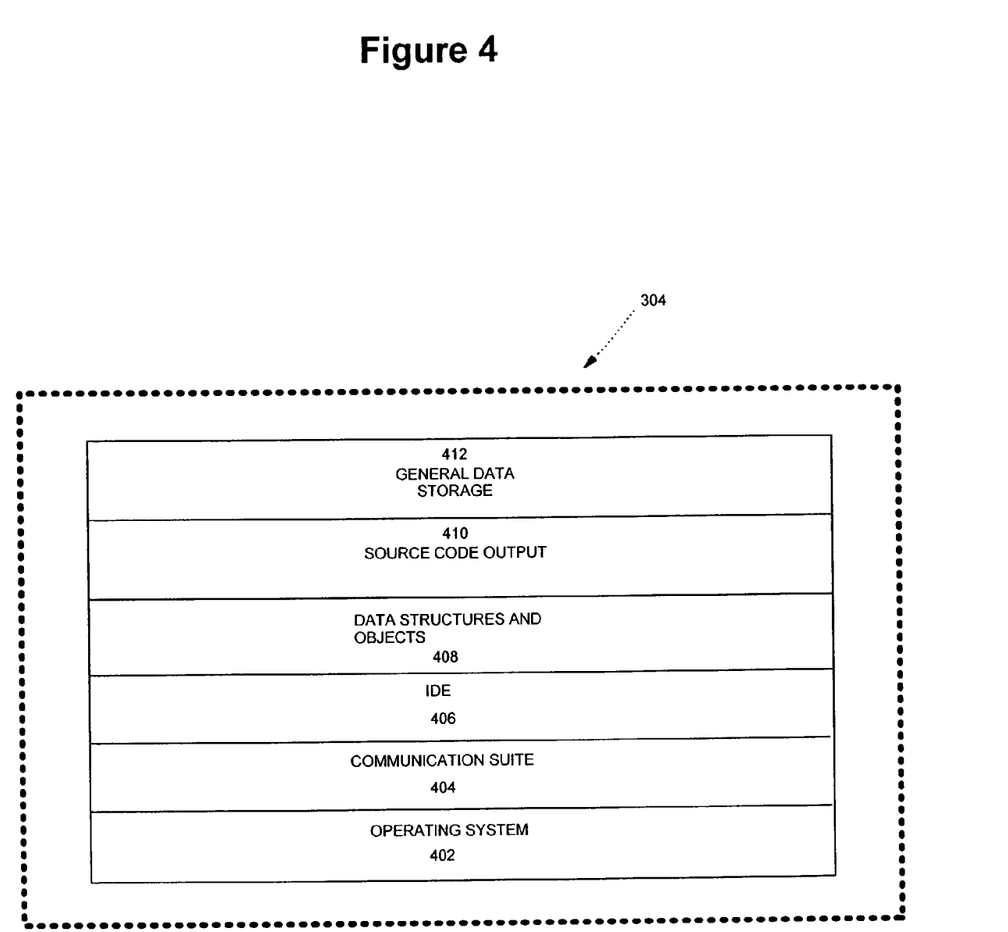
FIG. 4 illustrates, in functional block form, a portion of FIG. 3.

The computer data, instructions and/or applications stored in memory 304 and executed by CPU 302 (thus adapting the operation of computer system 200 as described herein) are illustrated in functional block form in FIG. 4. As will be appreciated by those of ordinary skill in the art, the delineation between aspects of the applications illustrated as functional blocks in FIG. 4 is somewhat arbitrary as the various operations attributed to a particular application as described herein may, in alternative embodiments, be subsumed by another application.

As illustrated, for exemplary purposes only, memory 302 stores operating system (OS) 402, communications suite 404, integrated development environment 406, data structures and object repository 408, source code output 410 and general data storage 412.

OS 402 is an operating system suitable for operation with a selected CPU 302 and the operations described herein. Multitasking, multithreaded OSes such as, for example, IBM AIX™, Microsoft Windows NT™, Linux or the like, are expected in many embodiments to be preferred. OS 402 also includes a Java Virtual Machine (JVM) which is the minimum set of executables, libraries and files that form the Java platform.

Communication suite 404 provides, through, interaction with OS 402 and network I/F 308 (FIG. 3), suitable communication protocols to enable communication with other networked computing devices via network 210 (FIG. 2). Communication suite 404 may include one or more of such protocols such as TCP/IP, ethernet, token ring and the like.

Integrated development environment (IDE) 406 provides the development environment for users of embodiments of the invention to create applications (e.g., applets, servlets, EJBs, etc.) which require communication between two systems (not shown). As noted above the two systems may be physically resident on the same machine or, alternatively, on separate machines communicating through operation of communication suite 404. IDE 406 may be embodied in known IDEs, such as IBM WebSphere® Studio, and modified to perform the functions and operations described herein. IDE 406 provides to a user a GUI in which data structures are rendered for visual display on display 204 (FIG. 2). Users of IDE 406 provide mapping input (typically through visually connecting elements in a target and source data structure) and, responsive to the input, IDE 406 outputs source code 410.

As is explained in greater detail below, IDE 406 receives a source and target data structure 102, 104 (FIG. 1) and data input by the user (representative of the visual mapping between the elements 106, 108 of data structures 102, 104, respectively). Based on the mappings created, the embodiment creates source code 410 (which, in the exemplary embodiment, are objects but could, alternatively include any type of source code or script which are employed to convert a first data element to a second data element) which, when interpreted, perform the requested mapping.

Data structures and objects 408 is a repository in which input data structures 106, 108 are stored. As mentioned hereinbefore, data structures 106, 108 comprise individual data elements (e.g., objects, variables, fields, records, etc.) and may include, for example, relational database tables, objects, structured language data structures and the like. Each individual data structure may include one or more data elements which have an associated type. For example, a data structure which corresponds to metadata describing a relational database table will include data elements which describe the number of columns (e.g., the number of data elements), the type associated with each of those columns (e.g., int, varchar, float, etc.) as well as additional data (e.g., metadata describing any key columns, size of columns, column restrictions, etc.).

Figure 6:
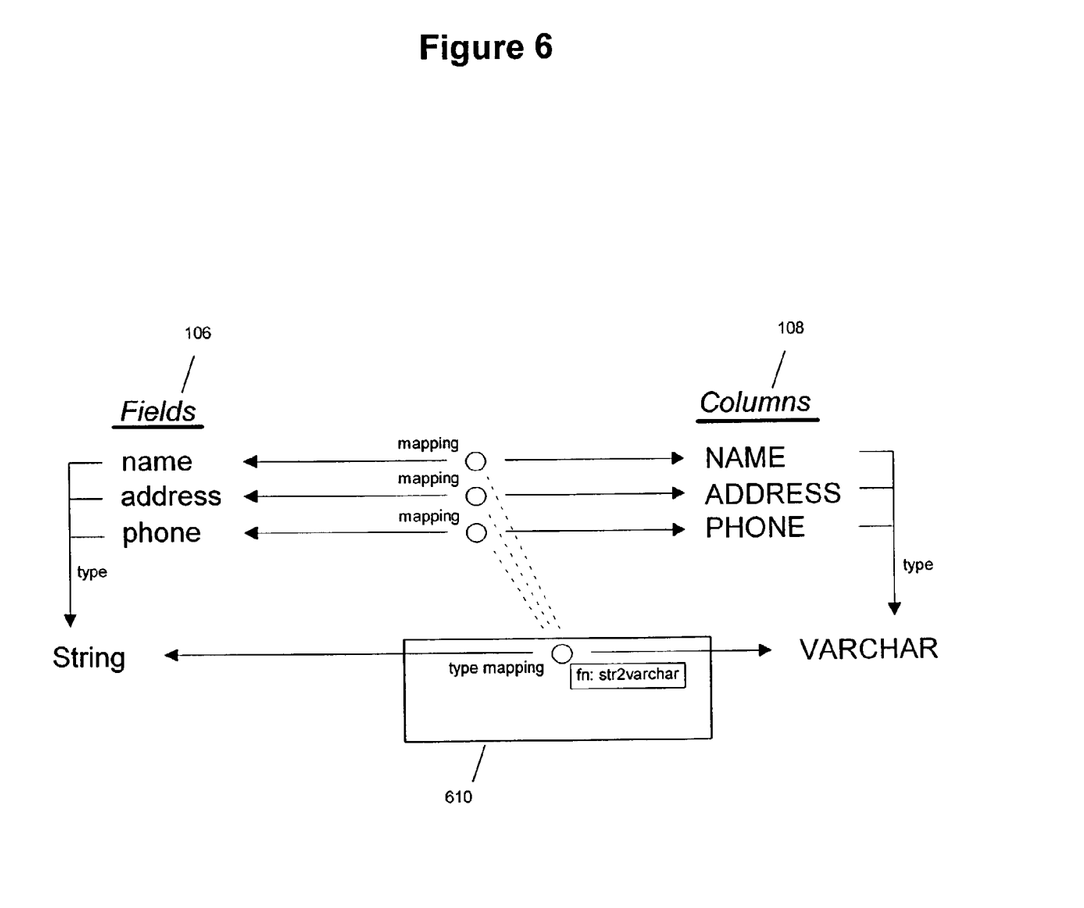
FIG. 6 is an example mapping between data elements for which the computer system of FIG. 2 generates source code.

Also stored in repository 408 are converter objects which have been created by IDE 406. As described above, the conversion between data elements is separated into two metalevels: the first describes data types; and the second describes a data element of the type described by the first metalevel. Hereinafter, the first metalevel, in the exemplary embodiment, is exemplified by a type converter object (see type converter object 610 of FIG. 6) while the second is exemplified by a data element converter object.

Type converter objects represent the first or top metalevel which provide the conversion function to map between data types (e.g., from "string" to "int"). As is explained in greater detail, there will generally exist only one type converter object in repository 408 for a conversion between a first data element type and a second data element type. That is, for converting between from a "string" (as that type has been defined by the language of the first system—e.g., Java) to an "int" (as that type has been defined by the language of the second system—e.g., SQL), there will, in many situations, be a single type converter object stored in repository 408 which is generated by IDE 406 and which performs this desired conversion. A second type converter object, also created by IDE 406 and stored in repository 408, would be tasked with performing conversion between a second pair of data element types (e.g., from "string" to "float", for example). As will be apparent, additional type converter objects would be created and stored in repository 408 for each additional pair of data types. As persons of ordinary skill in the art will appreciate, a data type, "int" for example, may be defined differently amongst different systems. As such, type converter objects are created to convert from a specific data type to another specific data type. For example, one system may define a "float" has having a certain level of precision (e.g., 32 bits) while another system defines "float" with a different level of precision (e.g., 64 bits). In such a situation, different type converter objects may be created for converting between from the first "float" definition and other type converter objects for converting from the second "float" definition.

As indicated above, data element converter objects are also created by the exemplary embodiment. Data element converter objects are also stored in repository 408.

Source code 410, as mentioned above, is code generated by IDE 406 so as to implement the mappings between data elements 106 and 108 (FIG. 1), as input by the developer. In an alternative embodiment, source code 410 may also be output to, and stored by, repository 408

The source code generated by IDE 406 will be better understood with reference to the pseudo-code (which is in Java) which is included below. As will be appreciated by those of ordinary skill in the art the invention is not limited to Java but could equally be embodied using other languages such as C++, C# (from Microsoft Corporation), SmallTalk, as well as structured languages.

The pseudo code implemented below includes three classes: Mapping; TypeMapping; and TypeConverter. With reference to the pseudo-code the following entities are used:

t1 is a first data type (e.g., a type associated with a first data element 106 illustrated in FIG. 1)

t2 is a second data type (e.g., a type associated with a second data element 108 illustrated in FIG. 1)

d1 is a first data element or data object (e.g., first data element 106)

d2 is a second data element or data object (e.g., first data element 106)

dm1 is the data representative of the mapping input by the user into IDE 406 tc1 is a type converter object (e.g., a type converter object that is forms part of the source code output 410 and may be stored by repository 408)

Referring to the pseudo-code below for the Mapping class, objects instantiated from the Mapping class receive the first and second data elements (or objects) for which the conversion is desired. That is, a Mapping object will be created to convert from a first data element 106 (FIG. 1)—e.g., d1—to a second data element 108.—e.g., d2. It is to be noted that Mapping objects do not, in most instances, include a type converter. However, as is explained in greater detail below, in some specific instances, such as those instances when a user implements a type converter that is unique to a selected pair of data elements, a mapping object may include a type converter.

---

MAPPING CLASS

```
public class Mapping
{
    private DataObject input;
    private DataObject output;
    private TypeConverter converter;
    private TypeMapping typeMapping;
    ...
    public TypeMapping getTypeMapping( ) {
        return typeMapping;
    }
    public setTypeMapping(TypeMapping tm) {
        typeMapping = tm;
    }
    public getConverter( ) {
        if (converter != null) return converter;
        else return typeMapping.getConverter( );
    }
    public setConverter(TypeConverter c) {
        typeMapping = c;
    }
}
```

---

As shown in the pseudo-code below, objects instantiated from the TypeMapping class are designed to receive as input the data types associated with the first and second data elements (e.g., t1 and t2, respectively).

| TYPEMAPPING CLASS |
| --- |
| public class TypeMapping<br>{<br>    private MetaObject input;<br>    private MetaObject output;<br>    private TypeConverter converter;<br>    ...<br>    public getConverter( ) {<br>        return converter;<br>    }<br>    public setConverter(TypeConverter c) {<br>        typeMapping = c;<br>    }<br>} |

As shown in the pseudo-code below, objects instantiated from the TypeConverter class are design with a single method, a method which converts from an input type to an output type. The string Output2InputFunction would, in an alternative embodiment, be used to convert data in the opposite direction. The Output2InputFunction would provide support bi-directional data flow. As such, the Input2OutputFunction and the Output2InputFunction would enable tracking of the function needed to convert from the input to the output type as well as the reverse function for converting the output type to the input type.

| TYPECONVERTER CLASS |
| --- |
| public class TypeConverter<br>{<br>    private String input2OutputFunction;<br>    private String ouput2InputFunction;<br>    ...<br>    public String setInput2OutputFunction( ) {<br>        return input2OuputFunction;<br>    }<br>} |

Figure 5:
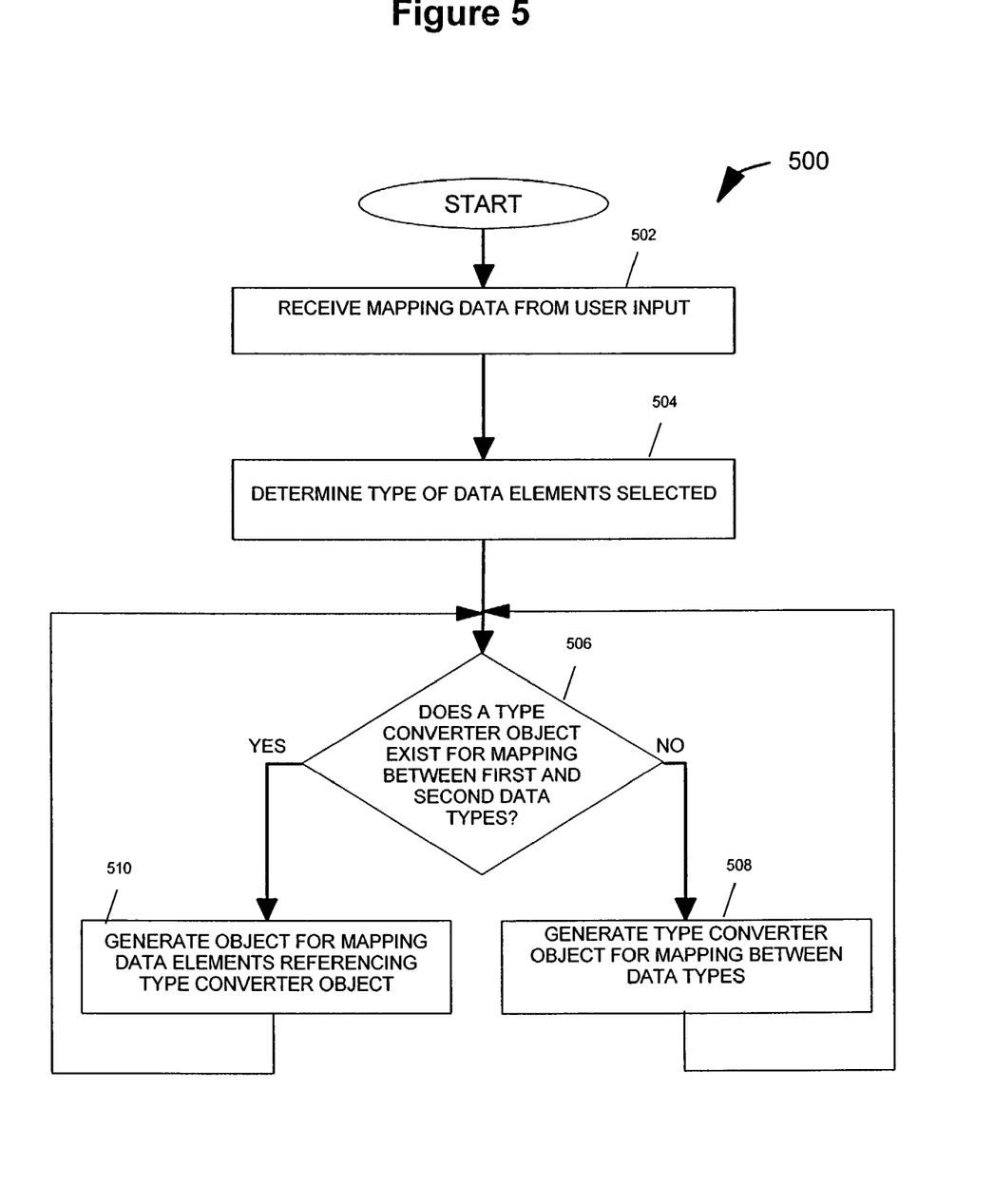
FIG. 5 illustrates, as a flow chart, the operations performed by the computer system of FIG. 2.

Referencing operations 500 (FIG. 5) which are performed by computer system 200 (FIG. 2) and more particularly the data and instructions stored in memory 300 which form IDE 406, source code 410 (which in the exemplary embodiment is in the Java language) will be generated by IDE 406 which will enable a user's mapping of a first data element 106 (d1) to a second data element 108 (d2). Initially, a user provides mapping data (which may be input through a GUI) between two elements, d1 and d2, respectively (S502). The mapping data, dm1, can be codified by instantiating an object of the Mapping class as indicated in the following pseudo-code:

Mapping dm1=new Mapping(d1, d2);

It should be noted that dm1 does not include a specific type converter.

System 200 then ascertains the data types associated with the data elements—t1 and t2 (S504).

Once the types associated with the d1 and d2 have been ascertained, an object of class TypeMapping—the object being identified as "tm1"—is instantiated (if one does not already exist—506) using types t1 and t2 (508). Also, an type converter object, tc1, is instantiated (if one does not already exist—506) from the TypeConverter Class using the data types associated with d1 and d2. The tc1 object is then used to set typeMapping element of the tm1 object. As will be appreciated, a converter specific to the two data types, t1 and t2, is now associated with the tm1 object. The instantiation of tm1 and tc1 and the setting of the converter in object tm1 is illustrated in the pseudo-code directly below.

TypeMapping tm1=new TypeMapping(t1, t2);
    TypeConverter tc1=new TypeConverter("convertToT2", "convertToT1"));
    tm1.setConverter(tc1);

In the exemplary embodiment, the type converter objects are created in advance of a data mapping and stored in repository 408. That is, for the most part, type converter objects are predefined and the type mapping instances are created by IDE 406. However, in alternative embodiments, mechanisms that allow users to define additional type mappings of their own can also be employed.

If a conversion between a first type, t1, and a second type, t2, is not known by the system then a user may be prompted to input data describing the conversion to be performed. However, in most instances, it is expected that a previously created type converter object (stored in repository 408, for example) would exist. But, as described below, embodiments of the present invention enable users to override the function defined by a (previously created) type converter object, if this need arises. In most cases, however, it is expected that the predefined type converter objects will be employed and a user will not have to be concerned about this functionality. The visual mapping input provided by the user through operation of IDE 406 will automatically "connect" the mapping data to the appropriate type converter object.

Once TypeConverter and TypeMapping objects have been instantiated for converting between the selected pair of data types, the setTypeMapping method of dm1 is invoked as indicated by the following pseudo-code (510):

m1.setTypeMapping(tm1);

Based on the objects created, when a type converter for data mapping dm1 is required it can be obtained, as indicated, using the following pseudo-code:

TypeConverter tc=dm1.getConverter( );

This will return tc1, the type converter from the associated type mapping tm1.

From the foregoing, persons of ordinary skill in the art will appreciate the numerous benefits and advantages of the above described embodiment of the present invention including, for example, reduced source code size, the ability to quickly and easily change a single converter function (e.g., tc) for a pair of data types which is then applied to all conversions involving the pair of data types, as well as others.

In addition to the foregoing, many alternatives and enhancements of the present invention are possible.

Figure 7:
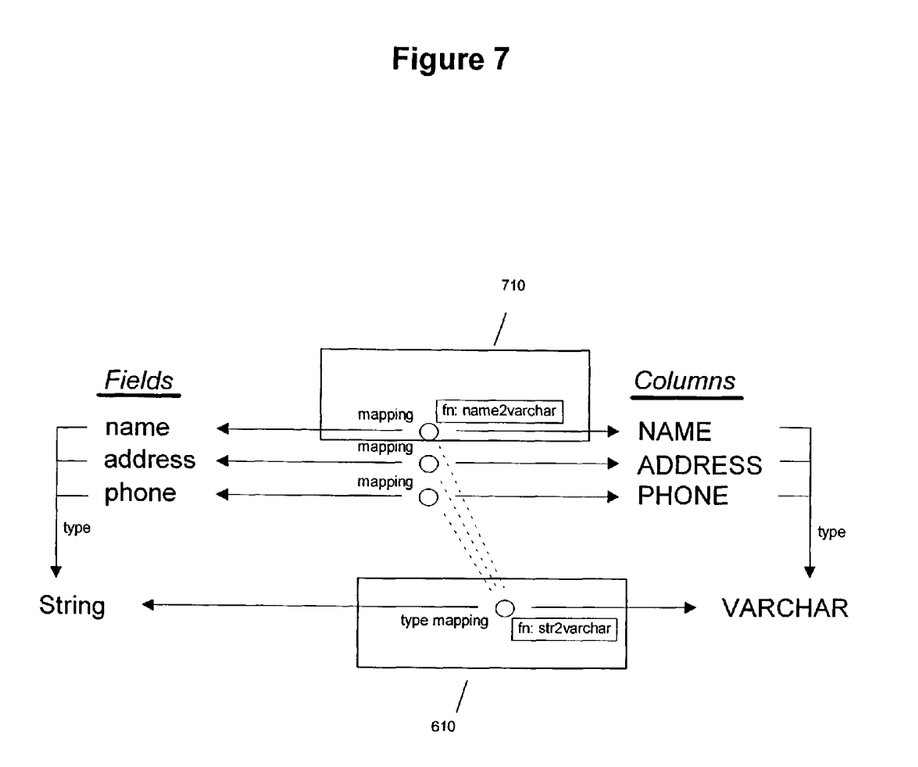
FIG. 7 is a further example mapping between data elements for which the computer system of FIG. 2 generates source code.

For example, it may be desirable in certain instances for a user to override the default type mapping function associated with a pair of data types. This is illustrated in FIG. 7 where the default type is indicated by default type mapping function 710 and a unique mapping function 710 is attached to a specific and selected pair of data elements.

A user may effect a specific type converter ("myconverter") by providing additional input into the GUI of IDE 406 (by, perhaps, using a right mouse button click on the connector visually connecting the selected pair of data elements). This input will invoke the following pseudo-code:

tc.setInput2OutputFunction("myConverter");

In the exemplary embodiment, underlying notification listeners in IDE 406 will result in the following pseudo-code be executed:

copyOftc=clone(tc);
    copyOfTc.setInput2OutputFunction("myConverter");
    tm1.setConverter(copyOfTc);

That is, a user's modification of a default converter type results in a copy or clone of the original type converter object, tc, being created for the selected pair of data elements only. This cloned object is then modified based on the user's input.

In a further alternative, the present invention may be embodied so as to assist developers in providing input data. In the above and main example, mapping object, dm1, was provided by the user as a result of an explicit mapping between two data elements (or objects). However, as indicated hereinbefore, a user may not be able to provide such mapping for numerous reasons including confusion. Accordingly, based on a selection of a single data element, system 200 may suggest an appropriate mapping based on the type converter objects previously created. For example, a user may have selected a first data element, t1, which is of type float. And, for the user, there exists two possible second data elements, t2 and t2', which are of type int and string, respectively. System 200 may present to the user a list of available type converter objects which convert from the type of the selected first element. Based on this additional information the user may then be able to provide a selection of a second data element. Continuing with the example above, the user may be presented with information indicating that a converter only exists from a float type to a string type. Accordingly, based on this additional information a user may select t2' as this data element is of type string. This feature of the embodiment could also be applied in reverse (e.g., the user selects the second data element but requires to select the first data element).

As will be appreciated by those skilled in the art, modifications to the above-described embodiment can be made without departing from the essence of the invention. For example, an embodiment of the invention could be applied to assist in the mapping of extensible markup language (XML) schema types.

In a further embodiment of the present invention, the two-level model, described hereinbefore, could also be employed so that the type-related portion of the mapping information for all the mappings between objects of the same types (e.g., type converters) are persistently stored in a repository (e.g., a database). In this embodiment, mapping code (e.g., mapping objects) could be generated as a separate operation which reference the type-related data in the repository.

In a still further embodiment of the present invention, intelligent automatic matching (requiring little or no user input) could also being achieved. In this embodiment, previously stored type mapping information (e.g., type converters stored in a repository) combined with name matching techniques, could be employed so that mappings can be deduced entirely without user interaction.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A method for generating source for converting from data stored in a first data element to data stored in a second data element, said first and second data elements associated with a first and second data element types, said method comprising:
   generating a first source code module to receive said first data element and output said second data element;
   calling by said first source code module a second source code module, the second source code module being specifically adapted to convert from the first data element type to the second data element type; and
   converting by said second source code module between said first data element type and said second data element type.

2. The method of claim 1, wherein said second source code module is predefined.

3. The method of claim 2, wherein said second source code module is stored in a repository.

4. The method of claim 1 further comprising:
   prior to said generating, customizing said second source code module so that said second source code module is unique to said first and second data elements.

5. The method of claim 4 wherein said customizing comprises:
   copying said second source code module; and
   modifying said copy of said second source code module so that said modified copy of said second source code module is unique.

6. A method for converting from a plurality of first data elements to a plurality of second data elements, each of said plurality of first data elements associated with a first data type and each of said plurality of second data elements associated with a second data type, and wherein a first data element forming part of said plurality of first data elements is to be mapped to a corresponding second data element forming part of said plurality of second data elements said method comprising:
   generating a first source code module for converting said first data type to said second data type, the first source code module being specifically adapted to convert from the first data type to the second data type; and
   generating, for each pair of first and second data elements, said first data element of said pair being mapped to said second data element of said pair, a second source code module receiving said first data element and outputting said second data element, said second source code module calling said first source code module.

7. The method of claim 6 further comprising:
   prior to generating said first source module, receiving mapping data describing the mapping between said first data element to said second data element.

8. The method of claim 6 wherein said first source code module is generated prior to said second source code module.

9. The method of claim 8, wherein said first source code module is stored in a repository.

10. The method of claim 6 further comprising:
    prior to said generating said second source code module, customizing said first source code module so that said first source code module is unique to said first and second data elements of a selected pair of first and second data elements.

11. The method of claim 10 wherein said customizing comprises:
    copying said second first source code module; and
    modifying said copy of said first source code module so that said modified copy of said second source code module is unique.

12. A method for generating source code to convert between a first data element and a second data element, said first data element associated with a first data type and said second data element associated with a second data type, said first and second data elements forming a mapping pair, said method comprising:
    for data received describing said mapping pair, identifying said first data type and said second data type;

generating source code for mapping said first data element to said second data element, said source code calling a separate data type converter corresponding to the first and second data types identified, the data type converter being specifically adapted to convert from the first data element type to the second data element type.

13. The method of claim 12 wherein said data type converter is predefined and stored in a data repository.

14. The method of claim 13 further comprising:
prior to identifying, receiving mapping data describing the mapping between said first data element to said second data element.

15. The method of claim 12 further comprising:
prior to said generating, customizing said data type converter so that said data type converter module is unique to said first and second data elements.

16. The method of claim 15 wherein said customizing comprises:
copying said data type converter; and
modifying said copy of said data type converter so that said modified copy of said data type converter module is unique to a said first and second data elements.

17. A computer readable media storing instructions and data, said instructions and data for adapting a computer system to generate source for converting from data stored in a first data element to data stored in a second data element, said first and second data elements associated with a first and second data element types, said computer system adapted to:
generate a first source code module to receive said first data element and output said second data element;
call from said first source code module a second source code module, the second source code module being specifically adapted to convert from the first data element type to the second data element type; and
convert using said second source code module between said first data element type and said second data element type.

18. The computer readable media of claim 17, wherein said second source code module is predefined.

19. The computer readable media of claim 18, wherein said second source code module is stored in a repository.

20. The computer readable media of claim 17, wherein said data and instructions further adapt said computer system to:
prior to said generating, customize said second source code module so that said second source code module is unique to said first and second data elements.

21. The computer readable media of claim 20 wherein data and instructions adapting said computer system to customize said computer system adapts said computer system to:
copy said second source code module; and
modify said copy of said second source code module so that said modified copy of said second source code module is unique.

22. A method of source code generation, said source code for mapping a first data object having a first data type to a second data object having a second data type, said method comprising:
responsive to input data describing said mapping, generating source code referencing a type converter object, the type converter object being specifically adapted to convert from the first data element type to the second data element type, said type converter object converting between said first data type and said second data type.

23. The method of claim 22, further comprising:
identifying said first data type; and
presenting a type converter object to a user, said type converter object presented converting from said first data type.

24. The method of claim 23, further comprising:
identifying said second data type; and
presenting a type converter object to a user, said type converter object presented converting to said second data type.

25. The method of claim 24, further comprising:
identifying said first and second data types; and
presenting a type converter object to a user, said type converter object presented converting said first data type to said second data type.

* * * * *